United States Patent [19]

Tamura

[11] 4,340,903
[45] Jul. 20, 1982

[54] TELEVISION CAMERA

[75] Inventor: Eiji Tamura, Tokyo, Japan

[73] Assignee: Sony Corporation, Tokyo, Japan

[21] Appl. No.: 175,776

[22] Filed: Aug. 6, 1980

[51] Int. Cl.³ .................... H04N 9/62; H04N 9/535
[52] U.S. Cl. .................................... 358/10; 358/4;
358/29; 358/181; 358/182; 358/183; 358/185
[58] Field of Search ................. 358/4, 22, 28, 185,
358/183, 182, 181, 127, 10, 29

[56] References Cited

U.S. PATENT DOCUMENTS 4,234,890  11/1980  Astle et al. ...................... 358/185

Primary Examiner—Richard Murray
Attorney, Agent, or Firm—Lewis H. Eslinger; Alvin Sinderbrand

[57] ABSTRACT

A television camera is adapted to be coupled to an external video device, such as a video tape recorder (VTR) or a camera control unit (CCU) linking it with other cameras. The output video signals from the cameras and VTR can be sequentially switched, mixed, or superimposed automatically to provide special effects. The camera comprises a video pick-up tube providing a video signal; an adjustable video signal control circuit for adjusting the video balance of the video signal; a microcomputer having a RAM with several addressable storage locations and a central processing unit for controlling the operation of the microcomputer and calculating a system control signal; a first switching control to selectively apply the balance-corrected video signal and a control level to the microcomputer to be read into one of the storage locations; a D/A converter for converting the contents of a selected storage location to a data control signal; a signal hold circuit for storing the data control signal; a second switching control for selectively coupling the signal hold circuit to the D/A converter; an input terminal coupled to the external video device to receive a camera control signal provided therefrom; and an output terminal for providing the system control signal, calculated by the microcomputer, to the external video device. Where one such television camera and a VTR are coupled to one another, the system control signal of the VTR can be used to control fade-in and fade-out.

11 Claims, 6 Drawing Figures

TELEVISION CAMERA

BACKGROUND OF THE INVENTION

1. Field of the Invention

The present invention relates generally to a television camera and is directed more particularly to a television camera in which a so-called microcomputer is used to carry out various operations including correction of the video signal and remote control of a video tape recorder, or VTR, and in which, if the camera is used in connection with a camera control apparatus, the video signal from the camera can be easily normalized by a control signal from the control apparatus.

2. Description of the Prior Art

When, for example, the white balance of a television camera is adjusted, the television camera first picks up a white object. Then, the level of the luminance signal Y is adjusted in relation to the color difference signals (R-Y) and (B-Y) such that the levels of the color difference signals coincide with that of the video signal during the blanking period.

When one television camera is used in conjunction with one VTR, the video signal and also a control signal to control the start, stop, and other functions of the VTR are supplied from the camera to the VTR, while a control signal to command the standby and other functions of the camera is supplied from the VTR to the camera. In this case, the signal lines for these signals are gathered as a single cable and are connected together to the camera by means of a plural-pin connector.

Further, a camera control unit or CCU can be used to control a plurality of the above cameras so that the latter are selectively used to pick up an object or scene. In such case, the phases of vertical and horizontal synchronizing signals and sub-carrier signals, pedestal levels, luminance levels, chroma-levels, and various other parameters must be made coincident among the respective cameras. To this end, control signals are fed to the respective cameras from the camera control unit. The signal lines therefor are also gathered as a single cable and then connected to the cameras.

There is however an intermediate possibility between the two foregoing arrangements, namely, an arrangement in which several cameras are connected to the VTR and are connected also to the camera control unit. In this arrangement, the contents of signals transmitted therebetween are different from each other and hence the operations carried out by the cameras are also different.

In general, a conventional video camera has only one output terminal so that the camera can be connected to only one of the VTR and the CCU.

With the above arrangement, when the video signal is edited and recorded while the video signal from the camera is subjected to so-called fade-in and fade-out operations, it is conventional to adjust the level of the video signal manually and also to start and stop the tape travel of the VTR by manually operating a control switch associated with the VTR. According to such conventional techniques, however, two manual operations have to be carried out simultaneously, making the operation rather complex and making it likely that an erroneous operation may occur. Further, with such manual techniques it is impossible to assure that the times of the fade-in and fade-out operations are constant.

OBJECTS AND SUMMARY OF THE INVENTION

Accordingly, an object of the present invention is to provide a television camera of simple construction which uses a microcomputer to carry out various operations, such as fade-in and fade-out operations.

Another object of the invention is to provide a television camera, the construction of which facilitates its use when a plurality of such television cameras are to be selectively used to pick up an object and to edit the video signals therefrom and then to record the edited video signal by means of a VTR, so that the synchronizing signals, signal levels, and other parameters of the video can be automatically made coincident among the cameras by use of a microcomputer, thereby obviating the need for a user's manual operation.

A further object of the invention is to provide a television camera in which a microcomputer is used so that, when a plurality of such television cameras are used together, the white balance of each camera and the level control of color signals from the respective cameras are easily adjusted by the microcomputer.

A still further object of the invention is to provide a television camera provided with a switch and a microcomputer by which the start and stop operations of a VTR can be easily performed and also the control of fade-in and fade-out of the camera.

According to an aspect of this invention, a television camera is adapted to be coupled to an external video device, such as a video tape recorder (VTR) or a camera control unit (CCU) linking the camera with other similar cameras. The television camera of this invention comprises a video pick-up tube for providing a video signal; and adjustable video signal control for adjusting the balance of the video signal; a microcomputer including a random-access memory (RAM) having a plurality of addressable storage locations and a central processing unit (CPU) for controlling the operation of the microcomputer and calculating a system control signal; a source providing a control level; a first switching control having inputs respectively coupled to receive the balance-adjusted video signal and the control level and an output coupled to the microcomputer for selectively coupling one of the inputs to the output for providing a corresponding data signal to the microcomputer to be read into one of the storage locations; a digital-to-analog converter for converting the contents of a selected one of the storage locations to an analog data control signal; a signal hold circuit for storing the analog data control signal; a second switching control coupled between the digital-to-analog converter and the signal hold circuit for selectively coupling the latter to the digital-to-analog converter; a camera input terminal coupled to the external video device to receive a camera control signal provided therefrom; and a camera output terminal for providing the system control signal calculated by the microcomputer to the external video device.

Various other objects, features, and advantages of the present invention will become apparent from the following description taken in conjunction with the accompanying drawings.

DETAILED DESCRIPTION OF THE PREFERRED EMBODIMENT

Figure 1:
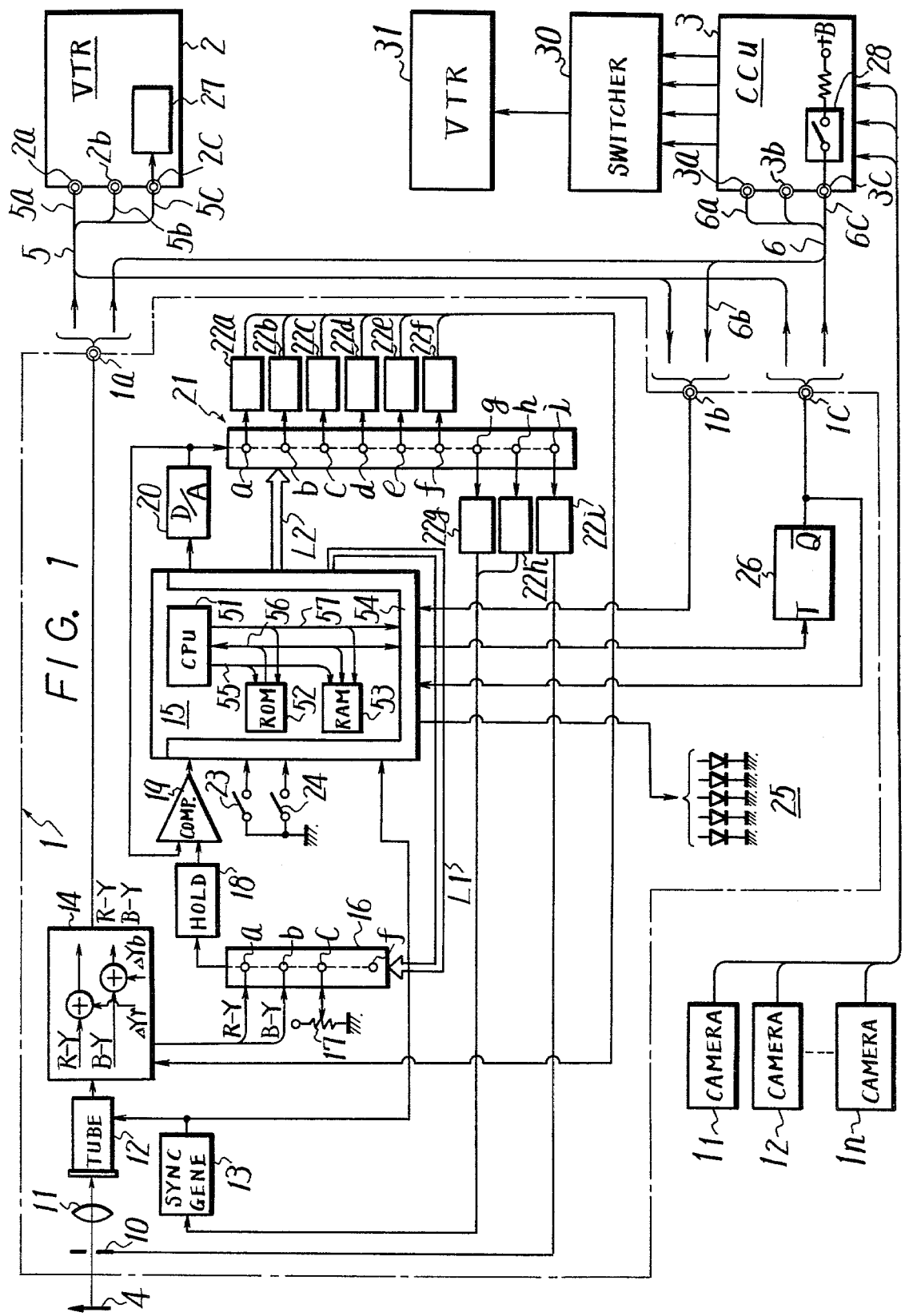
FIG. 1 is a system block diagram showing one embodiment of the television camera according to the present invention.

With reference to the attached drawings, and initially to FIG. 1 thereof, a television camera system according to this invention includes a television camera 1, a VTR (video tape recorder) 2, and a CCU (camera control unit) 3. The light from the object 4 to be televised is projected through an iris 10 and an optical lens 11 onto a pick-up tube 12. Horizontal and vertical synchronizing signals are provided from a synchronizing signal generator 13 and are furnished to the pick-up tube 12 which then produces a video signal representing the object 4. This video signal is delivered through a processor circuit 14 as a composite color video signal to a video output terminal 1a which is respectively connected through signal lines 5a of cables 5 and 6 to an input terminal 2a of the VTR 2 and to input terminal 3a of the CCU 3. The composite video signal includes a luminance signal (Y) and red (R-Y) and blue (B-Y) color difference signals. A plurality of television cameras $1_1, 1_2, \ldots 1_n$ constructed similarly to camera 1 are also connected to the CCU 3, and a plurality of normalized video signals from the CCU 3 are supplied through a switcher or mixer 30, which carries out a special effect operation on a picture to be reproduced, to a second VTR 31 to be recorded therein.

In camera 1, the correction and normalization of the video signal are carried out by a microcomputer 15. This microcomputer 15 is formed of a CPU (central processing unit) 51, a ROM (read-only memory) 52 in which there are stored the operation program for controlling CPU 51, a RAM (random-access memory) 53 having a plurality of addressable storage locations in which data are to be stored, and an input and output circuit 55. CPU 51, ROM 52, and RAM 53 are connected to one another through an address bus line 55, a data bus line 56, and a control bus line 57. Preferably, the above elements are formed on a single chip as a large scale integrated circuit (LSI).

A selector, or switch control circuit 16 has contacts a and b thereof coupled to processor circuit 14 to receive the red (R-Y) and blue (B-Y) color difference signals, respectively. Another contact c is coupled to a variable resistor 17 to receive a control voltage level therefrom. The position of the wiper of variable resistor 17 sets the fade-out or fade-in time, as discussed below. This selector 16 is changed over by a select signal suppled from the microcomputer 15 through a signal line L1. The signal from the selector 16 is supplied to a hold circuit 18 and the signal stored therein is applied to one input of a comparator circuit 19. The content at a desired address of the RAM 53 in the microcomputer 15 is supplied to a digital-to-analog, or D/A converter circuit 20 to be converted into a corresponding analog control signal which is in turn furnished to another input of the comparator circut 19. The compared output therefrom is supplied to the microcomputer 15.

The output from the D/A converter 20 is also suppled to a second selector 21 which is changed over by the select signal suppled from the microcomputer 15 through a signal line L2. The signals appearing at respective contact points a, b, . . . i of the selector 21 are respectively fed to hold circuits 22a, 22b, . . . 22i. The signals from the hold circuits 22a to 22f are applied to the processor circuit 14, while the signals from the hold circuits 22g and 22h are applied to the synchronizing signal generator 13, and the signal from the hold circuit 22i is furnished to a control circuit (not shown) for controlling the aperture of the iris 10. The processor circuit 14 includes various correcting and adjusting circuits for gamma-correction of the picked-up video signal, as well as adjustment of white balance, pedestal levels, and other parameters. The processor further includes a synthesizing circuit for synthesizing the luminance signal and color difference signals, and NTSC encoder, and other conventional circuitry. In the illustrated block representing the processor circuit 14, only a part of the white balance adjusting member is shown.

The signal from the synchronizing signal generator 13, which corresponds to the vertical blanking period, is supplied to the microcomputer 15, and during the occurrence of this signal, the values of the hold circuits 22a and 22i are refreshed by intermittent actuation of selector 21.

A white balance setting switch 23 and a remote control switch 24 for actuating the VTR 2 are connected to the microcomputer 15. An indicator array 25 (here shown as an array of LED's) is coupled to the microcomputer 15.

At a terminal 3b of the CCU 3, there is furnished a control signal for controlling the phases of the synchronizing signal and sub-carrier, the pedestal and luminance levels, the chroma level, and other like parameters. The terminal 3b is connected to a terminal 1b of the camera 1 through a control line 6b of the cable 6. The signal applied to the terminal 1b is then furnished to the microcomputer 15. In this case, if the above control signal occurs as a digital serial-coded signal, a number of control signals can be transmitted over a single control line.

Figure 2:
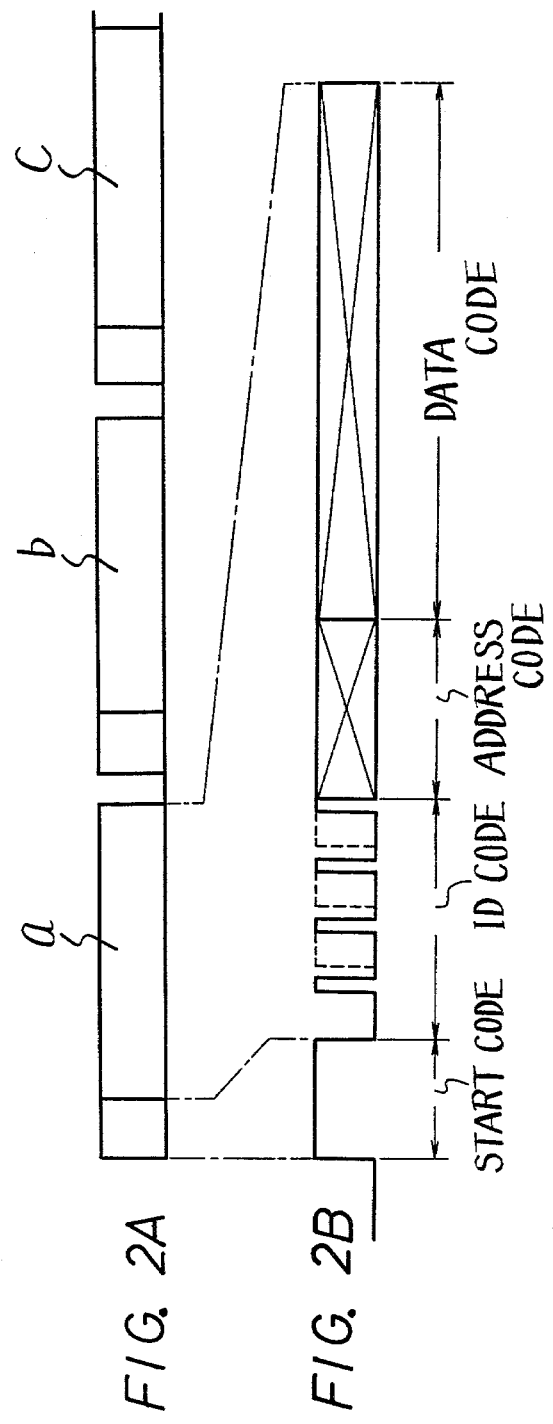
FIGS. 2A and 2B are waveform diagrams showing a serial-coded signal from the camera control unit used in the embodiment depicted in FIG. 1.

An example of such serial-coded signal is shown in FIG. 2B. In this example, following a start signal of a width of more than two bits and which is continuously in the high level, there are arranged, in sequence, an identification code of four bits, an address code of three bits, and a data code of eight bits. The identification code indicates to the microcomputer 15 whether the camera 1 is to be analog-controlled or digitally-controlled. Analog-controlled operations include, for example, iris control, pedestal level control, chroma level adjustment, and the phase shift of the color sub-carrier, while digitally-controlled operations include, for example, adjustment of the white balance. Further, it is discriminated by the address code which operation is to be carried out, i.e., whether to adjust the pedestal level, chroma level, or a like parameter of the video signal. Also, the eight-bit data code is read into RAM 53 to determine the amount of control required for the camera 1. If desired, the data code may be expanded or compressed. Further, the reading in of the serial-coded signal is achieved intermittently, for instance, upon the occurrence of a synchronizing signal.

FIG. 2A shows a serial-coded signal including a pedestal level adjusting code a, a chroma level adjusting code b, and a white balance adjusting start command code c, and FIG. 2B shows the code a in detail as described above. The above serial-coded signal may be transmitted each time that the direction of aim of the camera 1 is changed, or, for instance, when the illumination of a studio is changed.

The microcomputer 15 produces a signal in connection with the operation of the switch 24 and this signal is fed to a T-type flip-flop 26 at its trigger terminal T. The signal obtained from the flip-flop 26 at its output terminal $\overline{Q}$ is delivered to a terminal 1c whose potential is in turn applied to the microcomputer 15. The terminal 1c is connected also to a terminal 2c of the VTR 2 through a line 5c of the cable 5 and the terminal 2c is in turn connected to a system control circuit 27 of the VTR 2. The signal from the terminal 2c is fed to the system control circuit 27 to control the start and stop of the VTR 2.

The terminal 1c is connected also to a terminal 3c of the CCU 3 through a line 6c of the cable 6 and the terminal 3c is in turn connected to a return switch 28 of the CCU 3. When the return switch 28 is closed ON, a high potential or level appears at terminal 3c. In this case, the number of return switches 28 is selected to be the same as the number of the cameras connected to CCU 3, and only the camera whose corresponding return switch 28 is closed ON is actuated. Further, when the return switch 28 is closed ON, a lamp provided in the view finder in the corresponding camera is lit to show that the camera is started from the CCU 3.

When the terminal 1c of camera 1 is connected to the terminal 2c of the VTR 2, the impedance at terminal 1c is high since the terminal 2c is connected to the system control circuit 27 at its input. However, when the terminal 1c is connected to the CCU 3, since the terminal 3c is connected to the return switch 28 at its output side, the impedance thereof is low.

Figure 4:
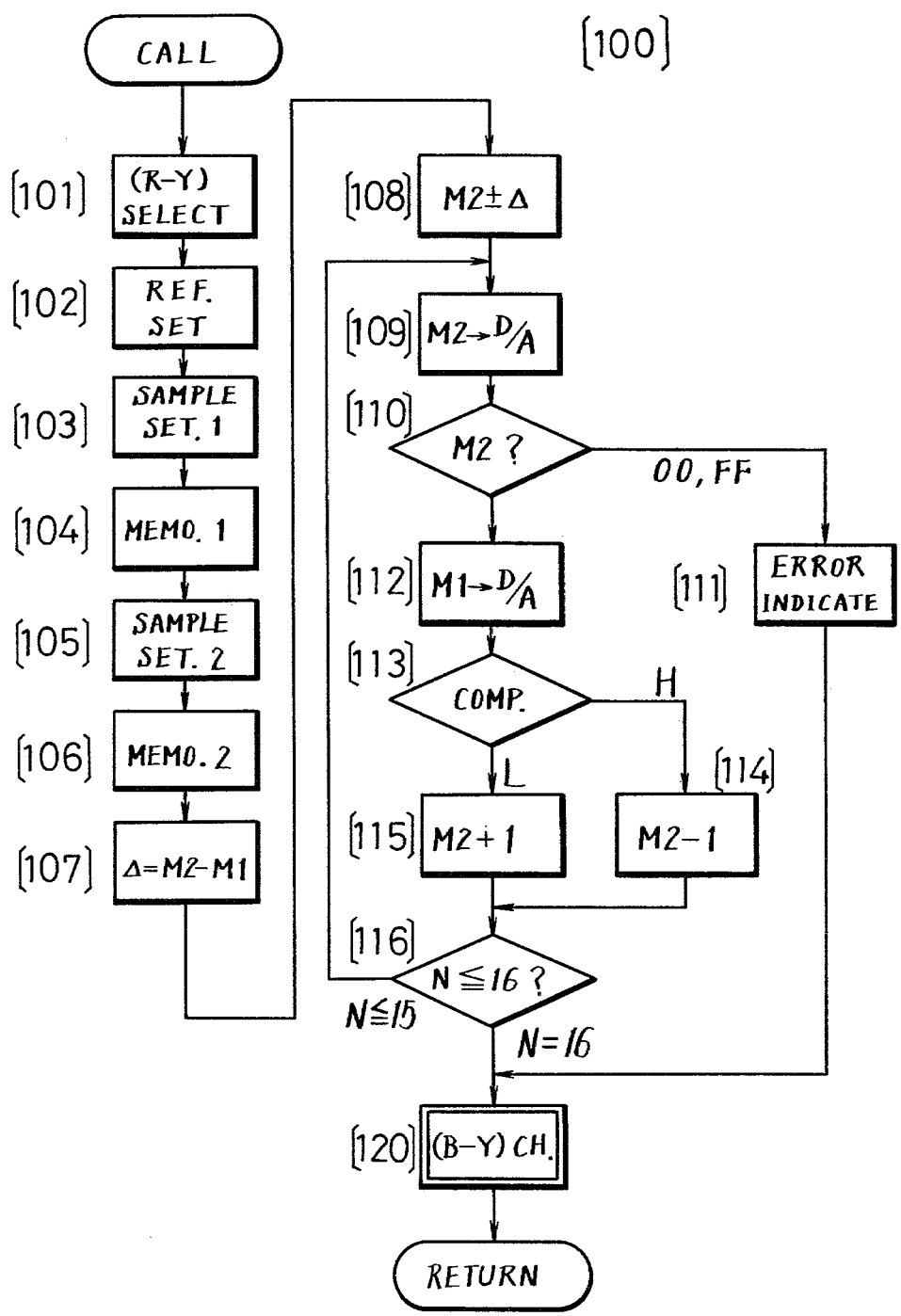
Figure 5:
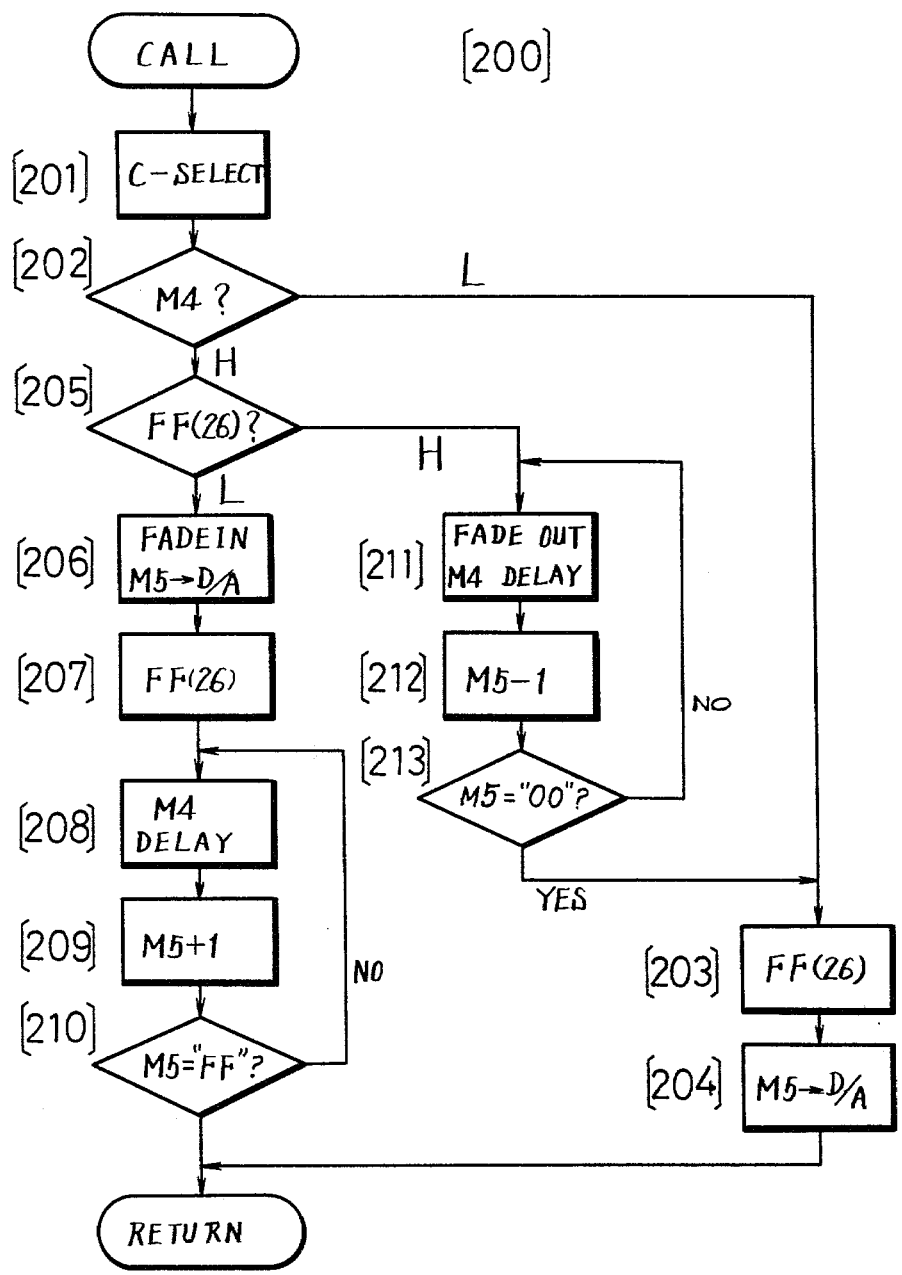

The program stored in the ROM 52 will be described with reference to the flow charts of FIGS. 3-5, and initially to FIG. 3.

Figure 3:
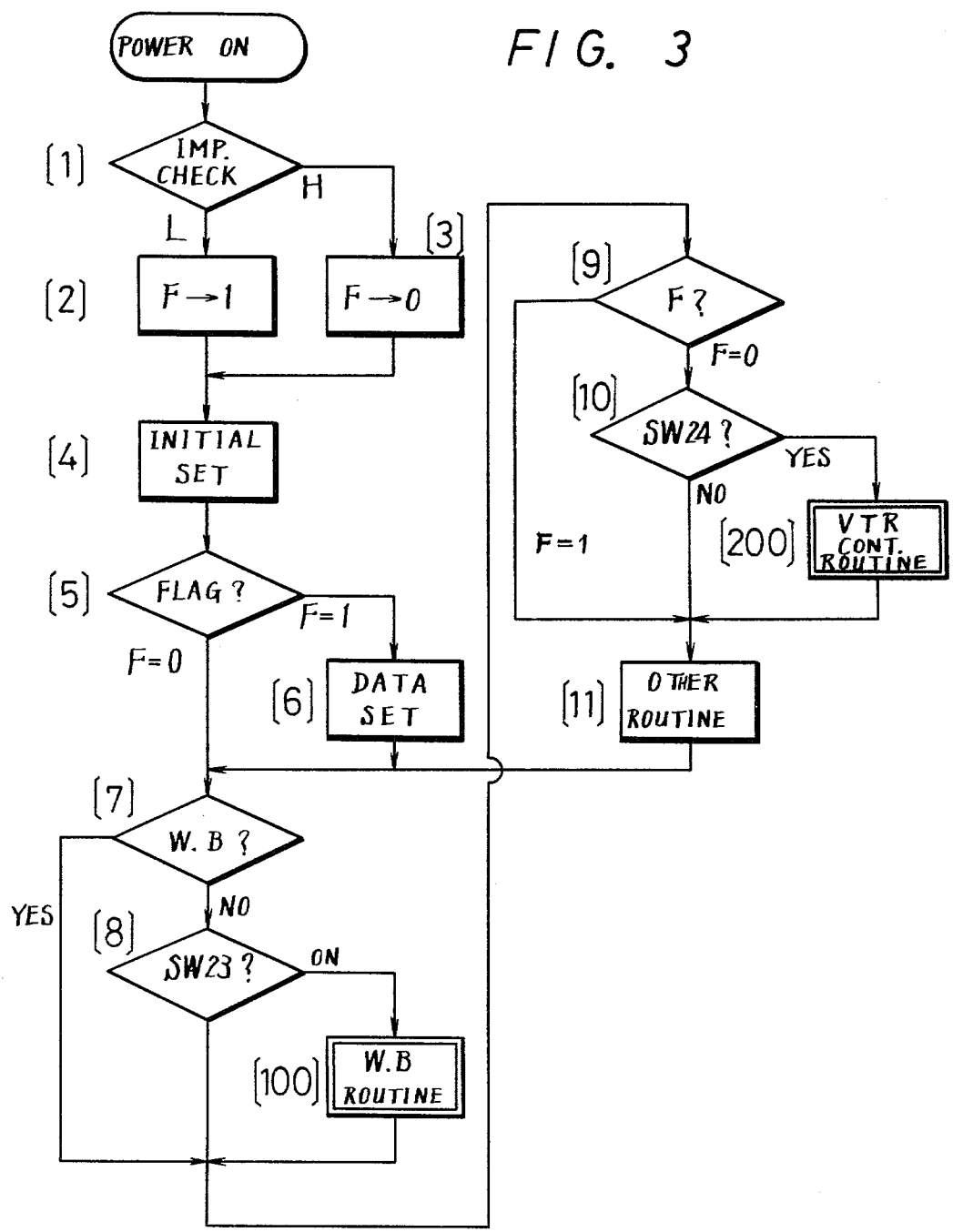
FIGS. 3-5 are flow charts used to explain the operation of the embodiment of the invention depicted in FIG. 1.

When the power is first turned ON, at the start of the program as shown in FIG. 3, the impedance at terminal 1c is detected.

In step [1], which is a decisional step, if the detected impedance is low (L in the flow chart) the program proceeds to step [2] and a flag F of the control apparatus mode is set at "1", but if the detected impedance is high (H in the flow chart), the program proceeds to step [3] and the flag F is set at "0".

At step [4], the selectors, including selectors 16 and 21, are set to be controlled by the microcomputer 15 and predetermined data values are set into selected ones of the storage locations of RAM 53. These initial data values may be changed by camera control signals sent from the external video devices, such as VTR 2 and CCU 3, connected to terminals 1a, 1b, and 1c of the camera 1.

At step [5], the flag F is discriminated. If flag F is detected to be "1", the program proceeds to step [6]; otherwise, if the flag F is detected to be "0", the program proceeds to step [7].

In step [6], the microcomputer 15 is enabled to read the serial-coded signed provided from CCU 3. Accordingly, when the serial-coded signal is furnished from the CCU 3 to the microcomputer 15 while the microcomputer 15 is so enabled, the main routine of microcomputer 15 is advanced to an interrupting-process subroutine or program, so that the serial-coded signal is read into the microcomputer 15 and the appropriate values are calculated.

If the flag F is determined to be "0", the microcomputer 15 is not controlled by the serial-coded signal, but is rather operated by conventional manual controls (not shown) on the camera 1.

At step [7], it is determined whether the white balance is properly adjusted. If the white balance is properly adjusted, the program proceeds to step [9], but if not, the program proceeds to step [8], a decisional step, in which it is determined whether switch 23 has been actuated. If switch 23 has not been so actuated, the program proceeds to step [9], but if switch 23 has been actuated, the program is advanced to an automatic white balance routine [100].

The routine for controlling white balance is described in detail in my copending Application Ser. No. 162,640, filed June 24, 1980, and which is incorporated herein by reference. The steps of that routine are discussed below.

When routine [100] is initiated at step [101], selectors 16 and 21 are changed over to their respective contacts a to select the red color difference signal R-Y.

In step [102], microcomputer 15 provides a digital value, such as the hexadecimal number "80" (corresponding to decimal 128) to digital-to-analog converter 20 and this value is stored in hold circuit 22a. It is noted that throughout this description, the numbers enclosed in quotation marks represent hexadecimal values.

In step [103], a sampling pulse, corresponding to the blanking interval of a composite video signal is furnished to selector 16.

In step [104], the level stored in hold circuit 18 is applied to one input terminal of comparator 19, and thence is stored as a digital quantity at a first storage location in RAM 53. Subsequently, this quantity is read out from the first storage location and is converted in converter 20 to analog form, and then is applied to another input terminal of comparator 19, where such analog level is sequentially compared with the signal level applied to the one input terminal of comparator 19. The quantity stored at the first storage location of RAM 53 is sequentially modified, thereby changing the level stored in hold circuit 23 until the levels at the input terminals of comparator 19 are substantially equal to one another. At the end of this step, the quantity stored in the first storage location corresponds in value substantially to the level stored in hold circuit 18.

In step [105], selector 16 is actuated by another sampling pulse corresponding to the video information portion, or scanning interval of the composite video signal.

In step [106], the signal level stored in hold circuit 18 is converted to digital form and is stored as a digital quantity in a second storage location in RAM 53. Thus, at the end of step [106], the quantity corresponding to the reference (blanking) level of the video signal during a blanking interval is stored at the first location in RAM 53 while the quantity corresponding to the level of the red color difference signal R-Y during a scanning interval is stored in a second storage location in RAM 53.

In step [107], a computational step, CPU 51 calculates the difference between the quantities stored in the second storage location and in the first storage location to produce a difference quantity $\Delta$ corresponding to the deviation of white balance.

In step [108], a quantity equal to "80" minus the difference quantity calculated in step [107] (i.e., "80"-$\Delta$) replaces the quantity stored in the second storage location in RAM 53. In other words, that quantity is decreased if the difference quantity $\Delta$ calculated in step [107] is negative, but is increased if the difference quantity $\Delta$ calculated in step [107] is positive. At the end of step [108], the quantity stored in the second storage location is substantially equal to the quantity stored in the first storage location of RAM 53.

In step [109], CPU 51 addresses the second storage location in RAM 53 so that the quantity stored therein is applied to digital-to-analog converter 20. Thus, an analog level corresponding to the quantity in the second storage location is provided from converter 20 to hold circuit 22a, which then provides at its output a control signal to determine the level of a luminance correction signal $\Delta Y_r$ to be added to the red color difference signal R-Y to correct the color balance. The correction signal $\Delta Y_r$ provided at the end of step [109] provides a good coarse adjustment of the white balance, and the white balance adjustment operation can end here, if desired.

However, because of irregularities in the level of the luminance signal Y, the following steps [110]–[120] are provided to effect fine adjustment in the white balance of the red color difference signal R-Y. Furthermore, rocking and/or vibration of the camera will cause slight variations in the luminance level if a portable camera is used, and the above steps [101]–[109] might not provide sufficiently exact adjustment of white balance.

In step [110], which is a decisional step, the microcomputer 15 decides whether to proceed with the fine adjustment by determining whether the quantity stored in the second storage location is outside a predetermined range, thereby indicating that the white balance adjustment to be made is outside the correction range of the white balance adjusting system. More particularly, if that quantity is equal to "00" or "FF" (where "F" corresponds to decimal 15) and thus indicates that an overflow condition has been attained, the microcomputer 15 will initiate an error indication subroutine (step [111]). Otherwise, if that quantity is within the predetermined range "01" to "FE", the program is advanced to step [112].

In step [111], if error, or data overflow, is detected as indicated above (corresponding to 00, FF in the flow chart) one of the indicators 25 is lit to indicate to an operator that the illumination color temperature is outside the range of automatic white balance correction, so that the operator can select an appropriate filter. Further, because sufficient adjustment cannot be made, the program goes to step [120].

In step [112], if the quantity in the second storage location is within the predetermined range the quantity in the first storage location is supplied therefrom to digital-to-analog converter 20, to be converted to an analog level and supplied to one terminal of comparator 19, where such analog level is compared with the level of the coarsely adjusted red color difference signal R-Y±$\Delta Y_r$.

In step [113], which is a decisional step, the microcomputer 15 determines whether the value of the coarsely adjusted color difference signal R-Y±$\Delta Y_r$ is higher or lower than the value of the output of converter 20. If the decision is made that the color difference signal is higher (H in the flow chart) then the program goes to step [114]; if lower (L in the flow chart), then to step [115].

Steps [113]–[115] are used to effect an incremental change in the quantity stored in the second storage location in the sense to minimize the difference between the level of the color difference signal and the analog level corresponding to that digital quantity. When the program goes to step [114], one bit is subtracted from the quantity in the second storage location, while if step [115] is selected, one bit is added to the quantity stored in the second storage location. Following either of steps [114] and [115], the program progresses to step [116].

In step [116], which is a decisional step, the microcomputer 15 decides whether the number of iterations of the steps [109],[110] and [113]–[116] are less than a predetermined number N or have equaled such number N. The number of N can, for example, be selected equal to sixteen. If the program has progressed to step [116] less than N times (i.e., from one to fifteen times), then the program returns to step [109]. However, when the program has progressed to step [116] N times (i.e., sixteen times), then the fine adjustment of white balance for the red color difference signal R-Y is completed, and the program progresses to subroutine [120]. Sixteen iterations will be sufficient to effect fine white balance adjustment, so long as the red color difference signal R-Y is within the correctable range.

Subroutine [120] represents the white balance adjustment routine for the blue color difference signal B-Y, and contains all the steps necessary to effect white balance adjustment with respect to the blue color difference signal B-Y. More particularly, selectors 16 and 21 are moved to their contacts b and are actuated to select the blue color difference signal B-Y from the processor 14 and to furnish such signal to hold circuit 18. Then steps corresponding to steps [101]–[116] are performed with respect to the blue color difference signal B-Y to effect both coarse and fine adjustment of white balance. During the operations of subroutine [120], the quantity stored in the first storage location in RAM 53 remains stored therein, and a quantity corresponding to the level of the sampled B-Y color difference signal during a scanning interval is stored in a third storage location in RAM 33. As the steps of the adjustment subroutine [120] are essentially identical to those of steps [102]–[116], a detailed description thereof is omitted.

Following the completion of the adjustment of the blue color difference signal B-Y, the white balance adjustment program is halted, and the program in ROM 52 progresses to step [9] of the main routine of FIG. 3.

Returning to FIG. 3, at a step [9], the flag F is again discriminated. If the flag F is determined to be "0", the program proceeds to step [10], in which it is determined whether the switch 24 is actuated. If switch 24 is so actuated, the program is advanced to a routine [200] for control of the VTR, Otherwise, if switch 24 is not actuated, the program advances to a step [11]. Further, if flag F is determined to be "1" in step [9], the program advances to step [11].

The routine [200] for controlling the VTR 2 will be described in detail with reference to the flow chart of FIG. 5.

When the routine [200] is reached in the program, at a step [201], the selectors 16 and 21 are changed over to their respective contacts c. Thus, the voltage level determined by the slider of variable resistor 17 is converted to digital form and stored as a digital quantity M4 in a fourth storage location of RAM 53.

In step [202], it is discriminated whether the quantity M4 is higher or lower than a predetermined value. If the stored quantity M4 is lower than the predetermined value (L in the flow chart), the program is advanced to step [203], and a trigger signal is furnished to the flip-flop 26.

Then, at a step [204], a digital value, such as "FF", which serves to maximize the gain of a gain control circuit used for fade-in and fade-out operations performed in processor circuit 14, is written into a fifth storage location of RAM 53, as a digital quantity M5. This quantity M5 is furnished through the D/A converter 20 to hold circuit 22c to establish the level held therein. Following this, the program is returned to the main routine, i.e., at step [11] of FIG. 3.

At step [202], if the quantity M4 is higher than the predetermined value (H in the flow chart) the program is advanced to step [205].

Step [205] is a decisional step to determine whether the output from flip-flop 26 is high. If the output from flip-flop 26 is low, the program is advanced to step [206] to commence a fade-in operation. Otherwise, the program is advanced to step [211], to begin a fade-out operation.

In step [206], a digital value "00", which serves to minimize the gain of the gain control circuit, is written into the fifth storage location of RAM 53 as digital quantity M5. This quantity M5 is then provided to the converter 20 to set the level in hold circuit 22c.

In step [207], a trigger pulse is supplied to the flip-flop 26.

In step [208], a delay corresponding to the quantity M4 stored in the fourth memory location is carried out.

In step [209], a "1" is added to the quantity M5 in the fifth storage location. This digital quantity M5 is then furnished to the converter 20 to set the value to be stored in hold circuit 22c.

In step [210], which is a decisional step, it is determined whether the quantity M5 in the fifth storage location is "FF". If the quantity M5 is not "FF", the program is returned to step [208]. That is, if the quantity M4 in the fourth storage location corresponds to the signal representing the unit time for performing the fade-in or fade-out operation, such an operation carried out over a predetermined time is achieved by the completion of steps [208]–[210].

When the quantity M5 in the fifth storage location becomes "FF", the program is then returned to the main routine, i.e., step [11] of FIG. 3.

When the output signal from the flip-flop 26 is determined to be in the high level in step [205], the program proceeds to steps [211], [212], and [213], for carrying out a fade-out program. That is, in step [211], a delay proportional to the quantity M4 stored in the fourth storage location of RAM 53 is carried out.

In step [212], the quantity M5 is decremented by "1", and then the resulting digital quantity is applied through digital-to-analog converter 20 to establish the level stored in hold circuit 22c.

In step [213], which is a decisional step, it is discriminated whether the quantity M5 in the fifth storage location is "00". If the quantity M5 is not "00", the program returns to step [211]. If the quantity M5 becomes "00" following steps [213], the program is advanced to step [203], and a trigger signal is supplied to flip-flop 26.

At step [204], a quantity "FF" is written into the fifth storage location, a voltage corresponding thereto is established in the hold circuit 22c, and the program is returned to the main routine at step [11] of FIG. 3. Thus, a fade-out operation is carried out over a predetermined time period in steps [211] to [213].

Returning to FIG. 3, step [11] represents various subroutines for controlling the VTR 2, and for establishing intermittent operation of, for example, selectors 16 and 21, as well as other necessary program steps. Following step [11], the program is returned to step [7], so that the program continues in a continuous loop while camera 1 is in operation.

The operation of the television camera of this invention can be summarized as follows.

When power is applied to the camera 1, it is automatically discriminated whether the VTR 2 and the CCU 2 are connected thereto, and then an appropriate mode of the camera 1 is established.

Further, if the switch 23 is actuated while the camera 1 televises a white object, the white balance of the video signal is automatically adjusted. At the time that the adjustment of the blue color difference signal B-Y is completed, the correcting signals for achieving white balance adjustment of the color difference signals R-Y and B-Y are respectively stored in the second and third storage locations of RAM 53 as digital quantities.

When switch 24 is actuated while the VTR 2 is stopped, a digital quantity which will minimize the level of the video signal is written into the fifth storage location of RAM 53. Thereafter, the signal at output terminal 1c for controlling the VTR 2 is made high, and, at every time period established by the position of the wiper of variable resistor 17, the quantity stored in the fifth storage location is increased. In contrast to the above, if the switch 24 is actuated while the VTR 2 is being driven, and then the VTR 2 is set into its stop mode, at every time period established by the position of the wiper of variable resistor 17, the quantity stored in the fifth storage location of RAM 53 is decreased. When this digital quantity reaches a minimum value, the signal at the output terminal 1c for controlling the VTR is made low. Thereafter, the quantity stored in the fifth storage location is returned to its maximum value.

These digital quantites are sequentially provided to the output during, for example, the period of the vertical synchronizing signal, and are set into hold circuits 22a, 22b, and 22c, respectively, whereby the white balance adjustment, and fade-in and fade-out operations can be easily carried out.

Further, various control signals from the CCU 3 are applied to the camera 1 as serial-coded digital signals, and are stored in respective storage locations of RAM 53 of the microcomputer 15. Later, these digital quantities are sequentially read out during the period of the vertical synchronizing signal, and are set into the hold circuits 22d to 22i to control respective functions of the camera 1.

It is possible, in keeping with the present invention, to omit various parts of the main routine of the microcomputer 15. For example, the steps [1] to [3] can be omitted, and the discrimination of the external video devices connected to the terminal 1b of the camera may be performed by some other method without necessitating the use of the microcomputer 15, and the program can then begin with step [4].

It is now apparent that the camera according to this invention, including a microcomputer, can easily and automatically carry out various routine functions, so that complicated adjustments can be performed in response to the stored program, thereby simplifying construction of the camera.

It is also apparent that many modifications and variations can be effected by one skilled in the art without departing from the scope or spirit of the present invention, which is to be determined by the appended claims.

I claim as my invention:

1. A television camera adapted to be coupled to an external video device, comprising:

video pick-up means for providing a video signal;

adjustable video signal control means for adjusting the balance of said video signal;

microcomputer means including a random-access memory having a plurality of addressable storage locations and a central processing unit for controlling the operation of said microcomputer and calculating a system control signal;

a source providing a control level;

first switching control means having inputs respectively coupled to receive the balance-adjusted video signal and said control level and output means coupled to said microcomputer means for selectively coupling one of said inputs to said output means for providing a corresponding data signal to said microcomputer means to be read into one of said storage locations;

digital-to-analog converting means for converting the contents of a selected one of said storage locations to an analog data control signal;

means coupling said analog data control signal from said converting means to said output means of said first switching control means, so that said output means provides as said corresponding data signal a comparison signal based on the selected one of said balance-adjusted video signal and said control level and on said analog data control signal;

signal holding means for storing said analog data control signal;

second switching control means coupled between said digital-to-analog converting means and said signal holding means for selectively coupling the latter to said digital-to-analog converting means;

input terminal means coupled to said external video device to receive a camera control signal provided therefrom; and output terminal means for providing the system control signal calculated by said microcomputer means to said external video device.

2. A television camera according to claim 1, wherein said external video device is selected from a variety of types of video device; and said microcomputer means includes means for determining the type of video device that has been selected and setting an initial value into one of said storage locations in response to such determination.

3. A television camera according to claim 1, wherein said pick-up means provides a composite color video signal formed of a luminance signal and a color difference signal; said adjustable video control means adjusts the white balance of said composite color video signal; and said microcomputer means computes a white balance control signal, which is converted in said digital-to-analog converting means, stored in said signal holding means, and furnished therefrom to said adjustable video signal control means to adjust said white balance.

4. A television camera according to claim 1, wherein said external video device comprises a video tape recorder having at least one operating mode; said first switching control means couples said output means to provide said control level to said microcomputer means; and further comprising means coupled to said microcomputer means and to said output terminal means to control said operating mode of said video tape recorder.

5. A television camera system comprising the television camera according to claim 1, and further comprising camera control means for coupling at least one additional television camera to said input terminal means and said output terminal means; and providing camera control signals to each of said television cameras to adjust simultaneously the video balance of each of said television cameras.

6. A television camera system according to claim 5, wherein said camera control means provides a camera control signal to each of said cameras to control the white balance of the video signal.

7. A television camera system according to claim 5, wherein said camera control means provides a synchronization control signal to each of said cameras.

8. A television camera system according to claim 5, wherein said camera control means provides a pedestal level adjusting signal to each of said cameras.

9. A television camera system according to claim 5, wherein said camera control means supplies said camera control signals in the form of serially-encoded signals.

10. A television camera according to claim 1, wherein the output means of said first switching control means includes a comparator having one input coupled to receive the selected one of said balance-adjusted video signal and said control level, another input coupled to said digital-to-analog converting means, and an output coupled to said microcomputer means.

11. A television camera according to claim 10, wherein said output means further includes a sampling hold circuit interposed between said converting means and said one input of said comparator.

* * * * *